April 26, 1927.

G. C. ABBE 1,626,374

DIFFERENTIAL LOCK FOR TRACTORS

Filed July 18, 1925

WITNESS:

INVENTOR
George C. Abbe
BY
ATTORNEYS.

Patented Apr. 26, 1927.

1,626,374

UNITED STATES PATENT OFFICE.

GEORGE C. ABBE, OF KENNETT SQUARE, PENNSYLVANIA, ASSIGNOR TO AMERICAN ROAD MACHINERY COMPANY, INC., OF KENNETT SQUARE, PENNSYLVANIA, A CORPORATION OF DELAWARE.

DIFFERENTIAL LOCK FOR TRACTORS.

Application filed July 18, 1925. Serial No. 44,500.

My invention relates to a differential lock for tractors and other motor operated vehicles.

As is well known, the provision of some form of differential is necessary in vehicles, such as tractors adapted to be self-propelled, in order to enable one of the driven wheels to rotate more slowly than the other when the vehicle is turned, as in going around corners or turning around.

The provision of a differential, however necessary to meet certain conditions, is frequently a source of disadvantage where the tractor is operating off a road, or in road building, or repair work in wet weather, since if one of the driven wheels comes upon a slippery spot and loses traction it will rotate freely due to the action of the differential, and the other wheel will receive no power. As a result, the tractor will not move.

To meet such conditions there has been proposed a variety of devices for locking the differential in order to insure the delivery of power to both wheels irrespective of whether or not one of them loses traction. Such devices as have been proposed have been open to a number of serious objections which have rendered them substantially impractical and chief among which is that when the differential is locked, the differential not only does not function when one of the wheels loses traction, but it does not function under any circumstances, as in turning, with the result that damage to the differential is likely to occur unless the lock be used only in cases where one of the wheels loses traction. Such is a serious disadvantage, especially when a tractor is working under adverse conditions where one or the other of the driven wheels frequently loses traction and at the same time the duty of the tractor requires frequent turning.

Now it is the object of my invention to provide a differential lock extremely simple in construction, which will effectively lock the differential when a driven wheel loses traction, and which at the same time will permit operation of the differential to permit either one of the driven wheels to rotate more slowly than the other when the tractor is turned.

Having now indicated, in a general way, the nature and purpose of my invention, I will proceed to a detailed description thereof, with reference to the accompanying drawing in which there is illustrated a preferred embodiment, and in which—

Figure 1:
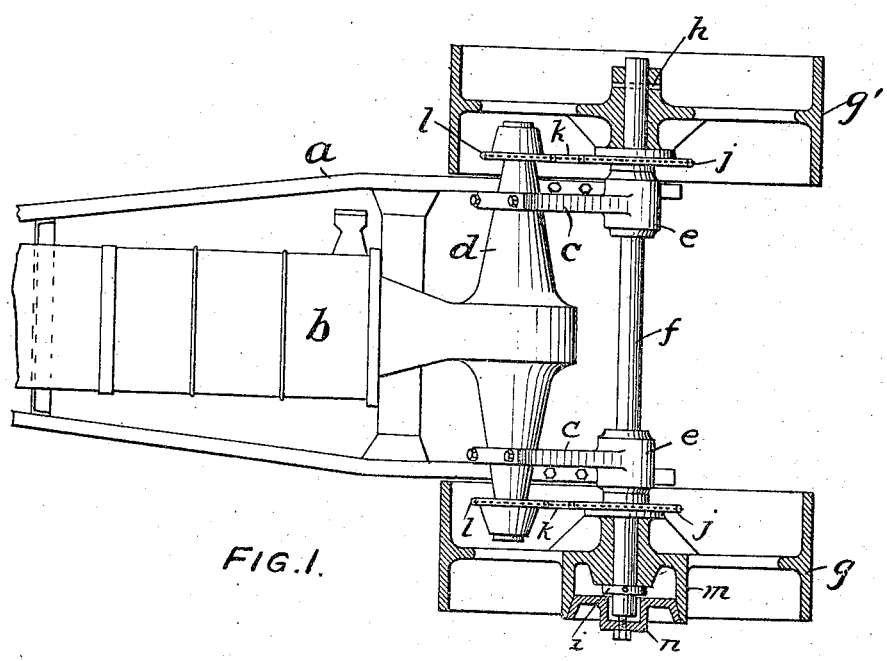
Fig. 1 is a plan view, partly in section, of the rear portion of a tractor embodying my invention.
Figure 2:
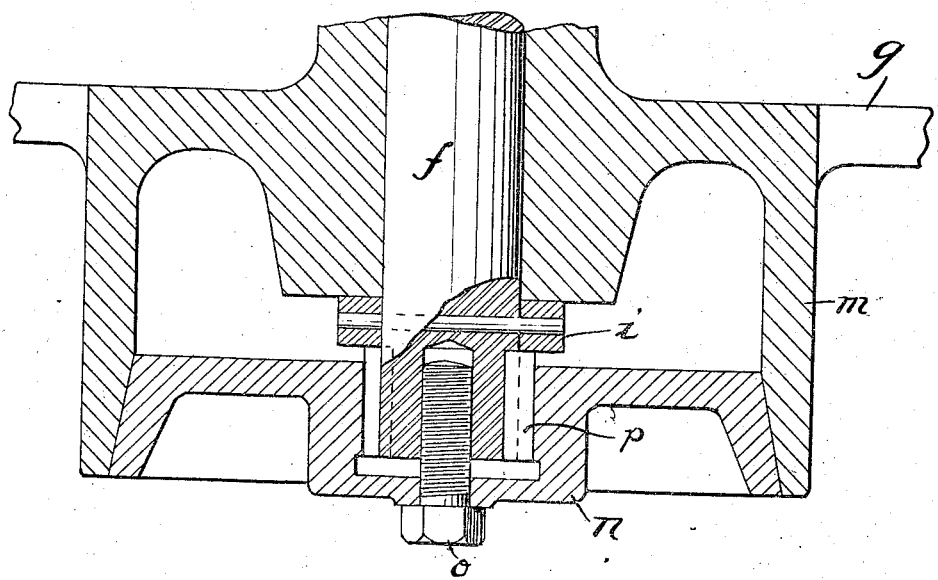
Fig. 2 is a sectional view, on a large scale, showing a detail of my invention.

$a$ represents the frame of the tractor upon which is mounted a power unit $b$, which, for example, may be a Fordson tractor from which the wheels have been removed.

Secured to the side members of the frame $a$ adjacent the rear end are a pair of brackets $c$ to which is clamped the rear axle housing $d$ of the power unit, which carries a differential and live axles.

Bearings $e$ are formed in the brackets and serve to support a rotatable axle $f$, which extends in parallelism with the live axles of the power unit. On the axle $f$ are supported a pair of wheels $g$, $g'$, the wheel $g'$ being pinned to the axle $f$ by means of a pin $h$, while the wheel $g$ is free to turn on the axle, being retained thereon by a collar $i$.

To the hubs of the wheels are secured sprockets $j$ connected by means of chains $k$ to sprockets $l$ secured to the ends of the live axles of the power unit.

The outer end of the hub of the wheel $g$ is formed to compose one member $m$ of a friction clutch of any type but preferably as shown, while the other member $n$ is splined, keyed, or otherwise secured on the end of axle $f$, being adjustable relative to the member $m$ by means of a bolt $o$ threaded into the end of the axle.

It will now be apparent that the wheels $g$ and $g'$ are driven from the live axle of the power unit through chains $k$, assuming the members $m$ and $n$ to be separated. The wheel $g'$ will be driven and will rotate axle $f$, while the wheel $g$ will be driven independently of the rotation of axle $f$. Thus, the wheels $g$ and $g'$ being independent, the differential of the power unit will be free to act.

If now one of the wheels $g$, $g'$ loses traction and it be desired to lock the differential, it is only necessary to draw member $m$ up to member $n$ by means of screw $o$, thus frictionally connecting wheel $g$ to axle $f$ and causing the drive on either wheel $g$ or $g'$ to be transmitted to the other irrespective of the tendency of either to slip, both under the circumstances being secured to the axle $f$, thus rendering the differential inoperative.

In the event that the members $m$ and $n$ be in operative relation and the tractor be driven around a corner or turned, the force tending to slow down the wheel on the inside of the arc or circle turned will cause the members $m$ and $n$ to slip relative to each other, thus permitting the differential to act and avoiding any possibility of damage.

Having now fully described my invention, what I claim and desire to protect by Letters Patent is:

1. In a tractor, in combination, a pair of wheels, a one piece axle extending through the hubs of both wheels, one of which is rotatably mounted on said axle and the other of which is fixedly mounted thereon, means for driving said wheels including a differential gearing having a two part shaft, driving connections between the axle and one part of the shaft, driving connections between the other part of the shaft and the wheel rotatably mounted on the axle, and means adapted to afford a connection between said axle and said wheel rotatably mounted thereon.

2. In a tractor, in combination, a power unit including a differential gearing having a two part shaft, a rear axle, a pair of wheels one of which is rotatably mounted on said axle and the other of which is fixedly mounted thereon, driving connections between each wheel and one of the parts of the shaft of said differential, a friction member fixedly mounted on said axle, a complementary friction member mounted on said rotatably mounted wheel, and means for adjusting one of said members in relation to the other whereby a desired degree of frictional engagement between said rotatably mounted wheel and said axle may be effected.

3. In a tractor, in combination, a power unit including a differential gearing having a two part shaft, a rear axle, a pair of wheels one of which is rotatably mounted on said axle and the other of which is fixedly mounted thereon, driving connection between each wheel and one of the parts of the shaft of said differential, a friction member fixedly mounted on said rotatably mounted wheel, a complementary friction member slidably mounted on said axle adjacent said first mentioned member, and means engaging said last mentioned member and said axle for adjusting said member relative to said first mentioned member, whereby a desired degree of frictional engagement between said members may be effected.

In testimony of which invention, I have hereunto set my hand, at Kennett Square, Penna., on this 3rd day of July, 1925.

GEORGE C. ABBE.